March 22, 1938. C. DELL ET AL 2,112,016
POWER TRANSMISSION SYSTEM
Filed March 24, 1936

INVENTORS
CYRIL DELL and
HERBERT L. READ.
By

Patented Mar. 22, 1938

2,112,016

UNITED STATES PATENT OFFICE 2,112,016

POWER TRANSMISSION SYSTEM

Cyril Dell, Berkhamsted, and Herbert Louis
Read, Hutton Mount, England

Application March 24, 1936, Serial No. 70,676
In Great Britain March 28, 1935

4 Claims. (Cl. 74—293)

This invention relates to an improvement in or modification of the power transmission system set forth in the specification of prior Patent No. 2,015,300.

In the power transmission device according to the aforesaid prior patent a vane wheel is interposed between the primary and secondary elements of a fluid coupling and is connected to one member of an epicyclic or differential gear, the primary of the coupling being connected to the input, the secondary to another member of the gear and the load being connected to a third member of the gear. The arrangement is such that the gear member driven by the vane wheel represents a lower gear from input to load than the one driven by the secondary, so that the lower geared member is rotated via the vane wheel prior to the secondary of the coupling being rotated. In one example the vane wheel drives the sun wheel of an epicyclic gear, the secondary drives the annulus thereof, and the load is taken off of the planetary system. The mechanical equivalents in other forms of differential gear will be readily understood without further description.

In practice, the mechanical gearing exerts a backward force on the secondary while the load in relation to the input power is large, suitable checking of the secondary to prevent backward movement enabling the vane wheel to pick up the load. Decrease of the load leads to a diminution of this backward force until eventually the secondary moves forward under the fluid drive and contributes to driving the load at higher speed ratios.

It follows that until the load (and consequently the backward force on the secondary) is reduced sufficiently to enable the secondary to take part in producing higher speed ratios commensurate with the load, the fluid columns in the coupling may be operating on the secondary wastefully, endeavouring prematurely to drive it forwardly. In such a circumstance there would be loss of kinetic energy in the device which is converted into heat harmfully affecting efficiency.

The present invention has for its object to improve the device according to our main patent so that same shall operate with full efficiency in all circumstances.

According to this invention, the secondary of the coupling is connected to its member of the mechanical gearing through a clutch, adapted to be disengaged for disconnecting the secondary and gearing when the ratio of load to power reaches a predetermined maximum value and to be engaged for connecting the secondary to the gearing whenever said ratio is below maximum value.

Preferably, the clutch is arranged to operate automatically. In one convenient embodiment the clutch is caused to engage by spring action and the factor which predetermines said maximum value of the ratio of load to power is the pressure to which the spring or springs is or are adjusted, as will be explained hereinafter.

Other features of the invention will be referred to as the description thereof proceeds.

One embodiment of the invention is illustrated by way of example in the accompanying drawing, wherein the mechanical gearing selected for illustration is the epicyclic example hereinbefore referred to. In said drawing:—

Figure 1:
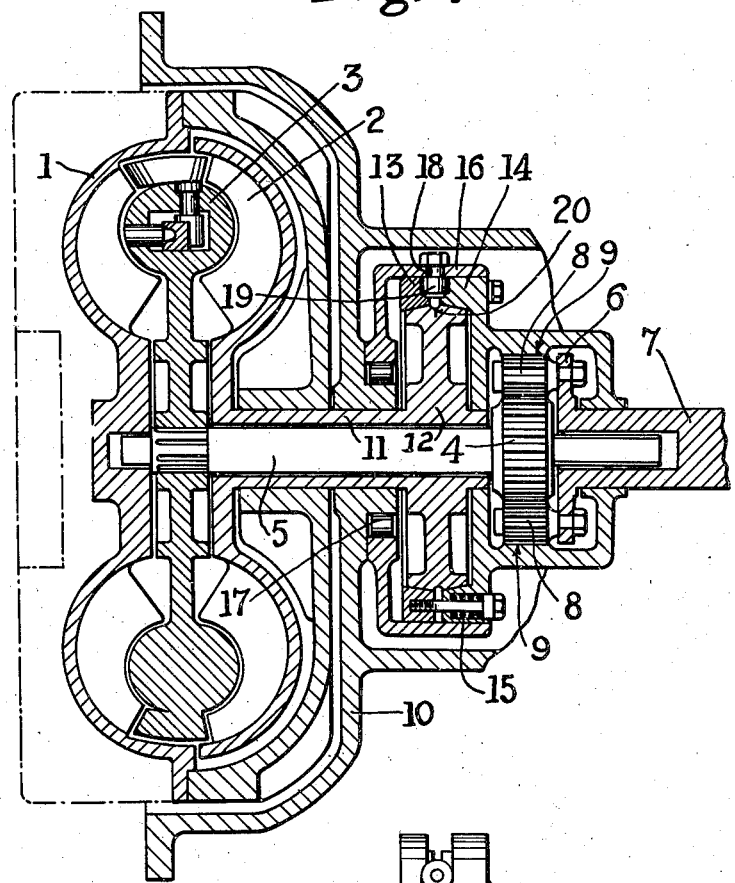
Figure 1 is a sectional view of the improved power transmission device.
Figure 2:
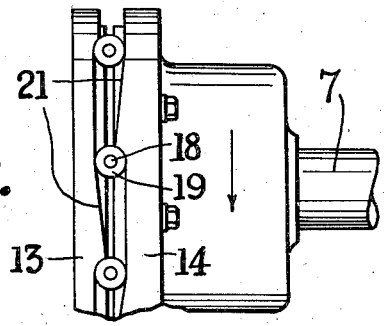
Figure 2 shows part of the clutch in outside elevation.

Referring to the drawing, the power transmission device comprises a fluid coupling including a primary member 1 connected to an input shaft (not shown), a secondary member 2 and a vane wheel 3 interposed between members 1 and 2. The device further comprises an epicyclic gear, including a sun wheel 4 fixed to the shaft 5 of said vane wheel 3, a planet carrier 6 integral with the driven shaft 7 and carrying planets 8 and an annulus 9 adapted to be connected to and disconnected from the secondary member 2 of the fluid coupling by means of a clutch, as will be described. The device is mounted inside a fixed casing 10 which may be bolted to machinery which the device is to serve, in well known manner.

The secondary member 2 of the fluid coupling is freely rotatable on the shaft 5 of the vane wheel 3 and carries a sleeve 11 which has integrally formed therewith, or secured thereto, the core member 12 of a double cone clutch. The clutch includes a rim member 13 having an inner conical face adapted to cooperate with one conical face of the core 12 and another rim member 14 having an inner conical face adapted to cooperate with the other conical face of the core 12. As shown, the rim 14 is integral with the annulus 9. Normally, the rims 13, 14 are urged towards one another by a plurality of circumferentially spaced springs 15 to engage the core 12 thereby connecting the annulus 9 to the secondary 2 of the fluid coupling.

Further details of the clutch will now be described. The rims 13, 14 are within a drum 16 which is mounted with the aid of the roller free wheel 17 on the fixed casing 10 for forward rotation only. The drum 16 has mounted therein a plurality of radial, circumferentially spaced pins 18 each having mounted thereon a freely rotatable roller 19 engaging between the opposite side faces of the rims 13, 14. Preferably, the core member 12 has a peripheral groove 20 in which the rounded ends of the pins 18 engage, for centering purposes. The opposite side faces of the rims 13, 14 have inclined portions 21, one corresponding to each roller 19, said inclined surfaces being adapted to cooperate with the rollers for disengaging the rims from the core member 12, as will be explained.

When the device is at rest or when it is running at normal power and load conditions, the parts occupy the position shown in the drawing. In normal running conditions the vane wheel 3 and the secondary 2 of the fluid coupling cooperate in driving the output shaft 7 through the lower geared sun wheel 4 and the higher geared annulus 9 respectively. The drive produced by the vane wheel 3 and the secondary 2 is additive and one or the other predominates to vary the gear ratio through the device in accordance with the variation of the load to power ratio. Should the ratio of load to power at any time reach a predetermined maximum value, at which the secondary 2 is unable to perform a useful driving function as explained earlier herein, the clutch automatically operates to disconnect the secondary 2 from the annulus 9, so that the secondary is rendered inoperative, until such time when said ratio falls below said maximum value, when the clutch is again engaged and the secondary rendered operative.

The aforesaid maximum ratio of load to power may obtain, for example, when starting up from standstill. The primary 1 of the coupling begins to rotate in forward direction and the vane wheel 3 follows, with the consequence that the sun wheel 4, the planet carrier 6 and the output shaft 7 rotate forwardly. The intercoupled assembly comprising the annulus 9, rims 13, 14, drum 16, core 12 and secondary 2 of the coupling is, however, urged to rotate in reverse direction, but is prevented from doing so by the free wheel 17. Obviously, the backward thrust on the annulus from the planets increases with the load on the output shaft 7, and when the ratio of load to power reaches a certain value, said backward thrust will so increase as to be capable of forcing the rims 13, 14 further back relatively to the drum 16 which is held by the free wheel 17. When this occurs the rims 13, 14 are parted by the cooperation of the inclined faces 21 with the rollers 19 against the action of the springs 15, the clutch being thereby disengaged and the secondary of the coupling released from the annulus. This condition will persist while the aforesaid backward thrust on the annulus is sufficient to part the clutch rims 13, 14, i. e., while the ratio of load to power is of the aforesaid predetermined maximum value. As soon as said ratio falls under said maximum value, i. e., as soon as the backward thrust on the annulus is insufficient to part the clutch rims, same will close under the action of the springs 15 and reconnect the secondary with the annulus.

It will be clear from the foregoing that ratio of load to power at which the clutch will operate to free the secondary of the fluid coupling depends on the force exerted by the springs 15, so that this force is the factor which determines said ratio. Thus, by selecting the springs as required in each particular case, the conditions at which the clutch is required to operate to disconnect the secondary of the coupling from the annulus may be predetermined.

The invention is not limited to the particular embodiment described and illustrated. Thus the clutch and the general arrangement may be different and if required the clutch may be hand operated, in which case the operator would manually disconnect the secondary from the annulus when this appeared to him to be requisite.

We claim:—

1. A power transmission device comprising a fluid coupling including primary and secondary members having a vane wheel therebetween, a driven shaft, a differential gear assembly of the epicyclic type including sun, annulus and planetary members mounted on a planet carrier, said planet carrier being connected with the driven shaft, a shaft for the sun gear connected with the vane wheel, clutch means between the secondary element and the annulus, and means for causing the clutch to operate automatically for disconnecting the secondary member of the coupling from the annulus of the gearing driven thereby when the ratio of load to power reaches a predetermined maximum value and to reestablish said connection whenever said ratio falls below said maximum value.

2. A power transmission device comprising a fluid coupling including primary and secondary members having a vane wheel therebetween, a driven shaft, a differential gear assembly of the epicyclic type including sun, annulus and planetary members mounted on a planet carrier, said planet carrier being connected with the driven shaft, a shaft for the sun gear connected with the vane wheel, clutch means between the secondary element and the annulus, and spring means set to a predetermined ratio of load to power for automatically disconnecting the secondary member of the coupling from the annulus of the gearing driven thereby when the ratio of load to power reaches a predetermined maximum value and to reestablish said connection whenever said ratio falls below said maximum value.

3. A power transmission device comprising a fluid coupling including primary and secondary members having a vane wheel therebetween, a driven shaft, a differential gear assembly of the epicyclic type including sun, annulus and planetary members mounted on a planet carrier, said planet carrier being connected with the driven shaft, a shaft for the sun gear connected with the vane wheel, clutch means between the secondary element and the annulus, a free wheel device adapted to prevent reverse rotation of the secondary of the fluid coupling, the clutch and the annulus, the clutch being arranged to operate automatically for disconnecting the secondary of the coupling from the annulus when the backward thrust exercised by the gearing on the annulus is large enough to overcome the force of the spring or springs tending to engage the clutch.

4. A power transmission device including a fixed casing, a fluid coupling including primary and secondary members having a vane wheel therebetween, a sleeve mounted in said fixed casing and connected to said secondary member, a shaft mounted in said sleeve and connected to said vane wheel, a differential gear of the epicyclic type including a sun wheel mounted on said shaft, a driven shaft having planetary gears mounted thereon and surrounding the sun gear and an annulus surrounding the planetary gears, and clutch means for automatically disconnecting the secondary member from the annulus, said clutch means including a clutch rim having a plurality of inclined faces and provided with an extension for housing the sun and planetary gears, a ring gear constituting the annulus within said extension meshing with said planetary gears, a second clutch rim also provided with a plurality of inclined faces, springs for connecting said rims, a clutch core mounted on said sleeve between the clutch rims, a free wheeling drum mounted on the fixed casing and having a portion overlying and housing said rims and rollers carried by said portion of the drum overlying the rims, said rollers cooperating with the inclined faces thereof, and said springs being set to permit the clutch to operate automatically to disconnect the secondary of the coupling from the annulus when the backward thrust exercised by the gearing on the annulus is large enough to overcome the force of the springs tending to engage the clutch rings.

CYRIL DELL.
HERBERT L. READ.